United States Patent

Seigel

[11] Patent Number: 5,869,759
[45] Date of Patent: Feb. 9, 1999

[54] METHOD AND APPARATUS FOR REGIONAL GRAVITY SURVEYS USING A GPS RECEIVER

[76] Inventor: Harold O. Seigel, 9 Oxbow Rd., North York, Ontario, Canada, M3B 1Z9

[21] Appl. No.: 701,871

[22] Filed: Aug. 23, 1996

[51] Int. Cl.$^6$ ..................................................... G01V 7/16
[52] U.S. Cl. ........................................................ 73/382 R
[58] Field of Search ............................... 73/382 R, 382 G; 364/449.7, 449.9; 342/457

[56] References Cited

U.S. PATENT DOCUMENTS

| | | | |
|---|---|---|---|
| 4,457,168 | 7/1984 | Lautzenhiser | 73/382 R |
| 4,550,601 | 11/1985 | Evans | 73/382 R |
| 4,718,274 | 1/1988 | Bell | 73/382 G |
| 5,216,920 | 6/1993 | Austin | 73/328 R |
| 5,402,340 | 3/1995 | White | 73/382 G |
| 5,461,914 | 10/1995 | Zumberge | 73/382 G |

OTHER PUBLICATIONS

Will Featherstone, Curtin University of Technology & Mike Dentith, The University of Western Australia, Matters of Gravity: The Search for Gold, 1994 (no month).

Primary Examiner—Christine K. Oda

[57] ABSTRACT

Method and apparatus for conducting regional gravity surveys, comprising a gravimeter module suspended below a helicopter and adapted to be lowered to the earth's surface for generating gravimeter readings. The gravimeter module includes an automatic reading gravimeter sensor and a mechanism for self-levelling of the sensor. A ground contact sensor is provided for determining when the gravimeter module contacts the earth's surface as a result of being lowered thereto and for determining when the gravimeter module ceases contacting the earth's surface as a result of being raised therefrom. The ground contact sensor generates a time marker indicative of these events. A GPS receiver is mounted in fixed relationship with the helicopter for generating periodic position coordinates. A system is provided for receiving and recording the subsurface gravimeter readings, the periodic position coordinates, and the time marker on a common time base. The system further includes circuitry for calculating the position coordinates of the gravimeter module when the gravimeter module contacts the earth's surface and when the module ceases contacting the earth's surface, by means of interpolating between respective values of the periodic position coordinates at the generated time markers.

21 Claims, 5 Drawing Sheets

METHOD AND APPARATUS FOR REGIONAL GRAVITY SURVEYS USING A GPS RECEIVER

FIELD OF THE INVENTION

This invention relates in general to gravity surveying and more particularly to a method and apparatus for conducting helicopter-suspended, land-gravimeter surveys, using precise GPS positioning, whereby accurate gravity measurements can be made in a rapid and cost effective fashion, without any requirement for the helicopter to land at each station.

BACKGROUND TO THE INVENTION

Gravimetry is a well known method of mapping subsurface geology utilizing potential fields, for resource development purposes. Although gravimetry is well known in the art, its application and use to date have been restricted by cost considerations relating to the cost of determining station elevation. Gravimeter measurements, per se, are largely meaningless unless accompanied by an accurate determination of the relative elevation of each station. To be consistent with the accuracy of modern first order gravimeters such as those manufactured by Scintrex Limited or La Coste, the determination of station elevation traditionally requires the application of optical levelling. Optical levelling is a slow process and is costly for determining the elevation of widely spaced stations (eg. 1 km or more apart), or when applied in rugged or forested areas. By way of contrast, gravimeter readings themselves are fast, typically requiring only 2–3 minutes per station, and they constitute only a minor portion of the total survey cost where optical levelling is employed. Other means of determining station elevation, such as the use of micro-barometric altimeters, result in much lower accuracy (typically ±1 m to ±3 m in elevation, equivalent to ±0.03 mGals to ±1 mGals in gravity).

Recent developments in the design of differential GPS (Global Positioning System) receivers has resulted in the ability to obtain high accuracy gravimeter station elevation calculations. For example, Fetherstone and Dentith, "Matters of Gravity: The Search for Gold", GPS World, July 1994, have shown that a standard deviation (SD) of a measurement of 2.2 cm can be realized by such means. In terms of speed and cost, this represents a major advance in the field of gravity surveying where the stations are more than 500 m apart.

The use of helicopters to transport and position gravimeter crews has also been well known in the art for several decades. The efficiency of this practice, however, relies heavily on the availability of suitable landing sites which are conveniently located in proximity to the desired station locations. This, unfortunately, is not always the case, particularly where the stations are located in rugged topography, water covered or in marshland, in closely spaced tree cover, etc. In some areas, there are prohibitions against landing, due to hazards or to protect delicate environmental biosystems, etc.

SUMMARY OF THE INVENTION

It is an object of an aspect of this invention to provide a highly cost effective, rapid and accurate means for performing helicopter-supported, regional or semi-detailed gravity surveys, in otherwise difficult areas, without the necessity for the helicopter to land at each station. It is a further object of an aspect of the invention to provide a method of obtaining low-cost and rapid determination of station elevation.

Therefore, in accordance with the present invention, there is provided an apparatus for conducting helicopter-supported gravity surveys, comprising a gravimeter module suspended below a helicopter and adapted to be lowered to the earth's surface for generating gravimeter readings. The gravimeter module includes an automatic reading gravimeter sensor and a mechanism for self-levelling of the sensor. A ground contact sensor is provided for determining when the gravimeter module contacts the earth's surface as a result of being lowered thereto and for determining when the gravimeter module ceases contacting the earth's surface as a result of being raised therefrom. The ground contact sensor generates a time marker indicative of these events. A GPS receiver is mounted in fixed relationship with the helicopter for generating periodic position coordinates. A control and data acquisition system is provided for receiving and recording the gravimeter readings, the periodic position coordinates, and the time marker on a common time base. The control and data acquisition system further includes circuitry for calculating the position of the gravimeter module when the gravimeter module contacts the earth's surface and when the module ceases contacting the earth's surface, by means of interpolating between the periodic GPS position coordinates before and after the generated time markers.

BRIEF DESCRIPTION OF THE DRAWINGS

A detailed description of the invention is provided herein below with reference to the following, in which.

DETAILED DESCRIPTION OF THE PREFERRED EMBODIMENT

Figure 1:
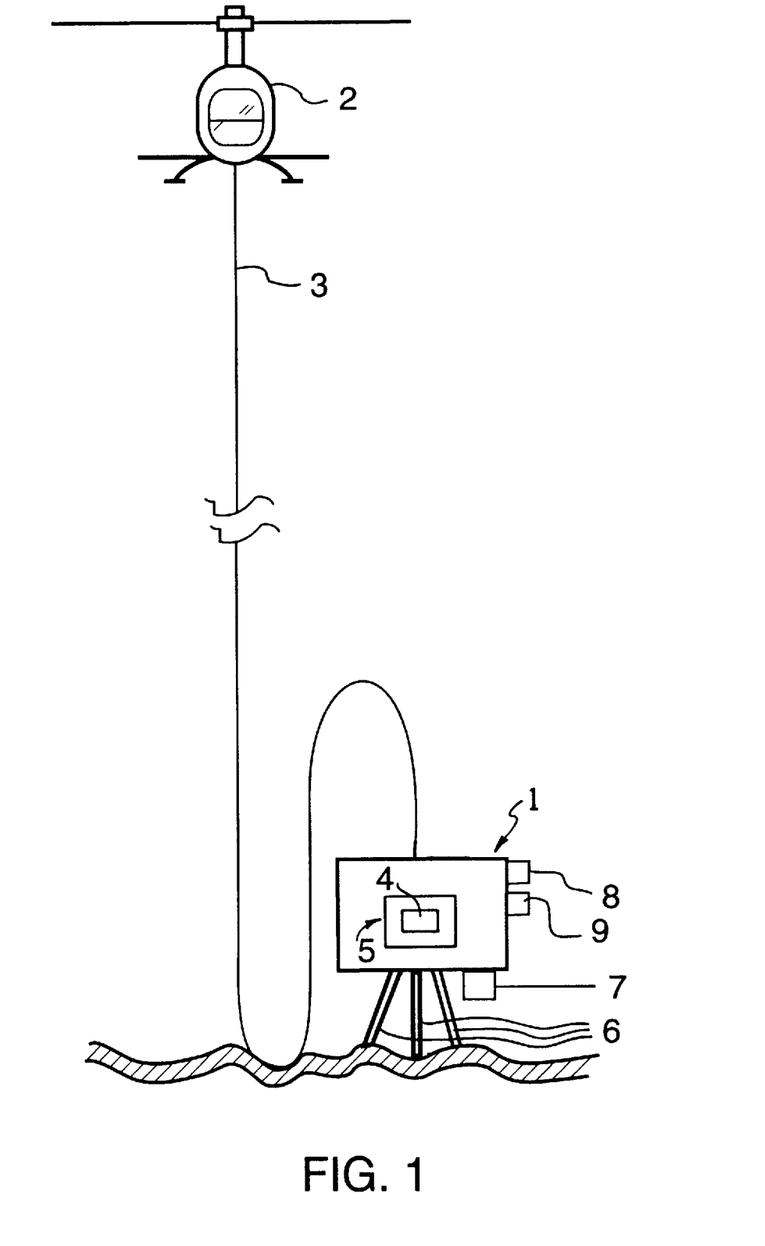
FIG. 1 shows an apparatus for conducting helicopter-supported gravity surveys in accordance with the present invention.

Turning to FIGS. 1, a gravimeter module 1 is shown suspended below a helicopter 2 by a tow and communication cable 3. The gravimeter module contains a gravimeter sensor 4 and a self-levelling, dual-gimbal system 5. External to the gravimeter module is a ground contact sensor 6, a ground proximity sensor 7, a water pressure monitor 8, and a water immersion sensor 9.

Figure 2:
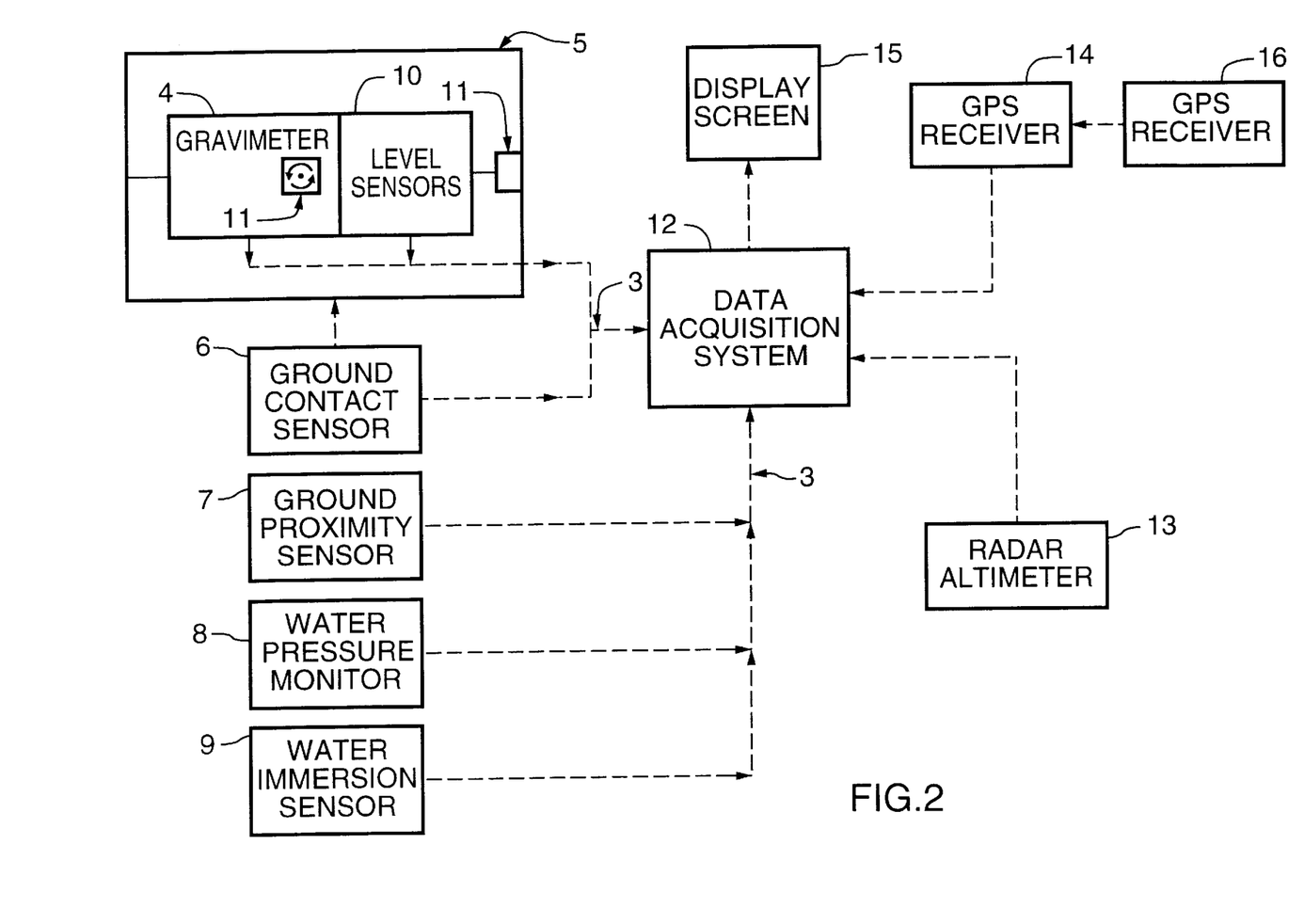
FIG. 2 is a block diagram showing component parts of the apparatus according to the present invention.

FIG. 2 shows the component parts of the system gravimeter module 1 and its connection to equipment onboard the helicopter 2. The dual-gimbal system 5 is shown comprising gravimeter system 4, level sensors 10 rigidly mounted to the gravimeter sensor 4 and a pair of servo motors 11. The level sensors 10, generate output signals which are proportional to the offset angle of the gravimeter sensor 4, from vertical. These signals control the servo motors 11, which, in turn, level the gravimeter sensor. This system operates essentially as a closed feed-back loop.

Figure 5:
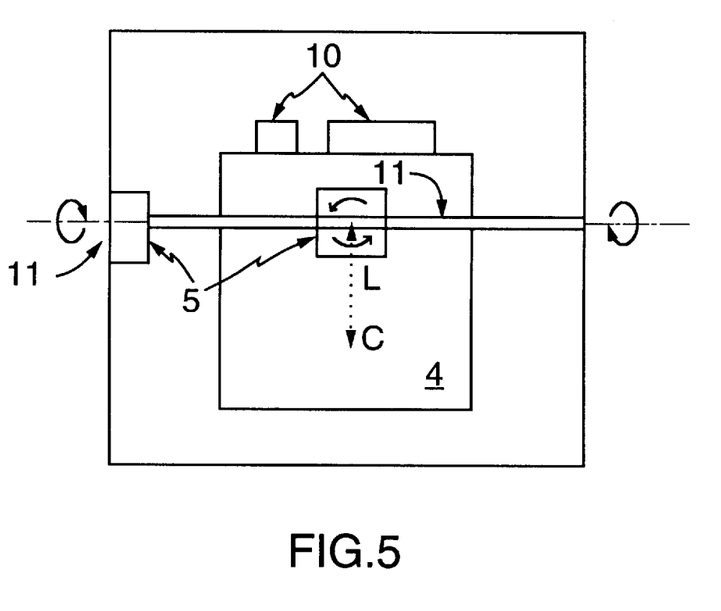
FIG. 5 illustrates, in greater detail, the operation of the self-levelling system.

FIG. 5 shows, in somewhat greater detail, the operation of the self-levelling system. The two level sensors 10 are mounted and adjusted so as to be orthogonal to each other and to the mechanical (vertical) axis of the gravimeter sensor 4. Each level sensor 10 provides a DC signal output which, in sign and amplitude, gives an indication of the deviation of its axis from horizontal, in direction and amount. These signal outputs provide the measure of the deviation of the mechanical axis of the gravimeter sensor 4 from the true plump-bob vertical. The dynamic range of these level sensors 10 is typically ±1500 arc seconds, and their resolution is typically 1 arc second.

The precision required in levelling is determined by the need to measure the relative value of gravity to better than 5 $\mu$Gals. In terms of effective precision of alignment to the vertical, this means that the alignment error angle $\ominus$ must satisfy the equation $1-\cos^2\ominus<5\times10^{-9}$ (i.e., $\ominus<20$ arc seconds).

The gravimeter module 1 may come to rest at a substantial inclination to the horizontal, because of irregularities of the ground surface. The system of the present invention is intended to allow for inclinations of up to 36° from the horizontal. The design of the self-levelling system is such as to accommodate such large inclinations, and yet perform the self-levelling to the required precision (<20 arc seconds) within less than 10 seconds.

In order to do so a two stage system is employed, including firstly a gravity-based pendulum action and then a servo-motor-based action.

As FIG. 5 shows, the centre of gravity C of the gravimeter sensor 4 is at a distance L below the central point of suspension of the sensor. When the gravimeter assembly 1 comes to rest on the surface, activating the ground contact sensor 6, the signal from this sensor releases the clutches on the servo motors 11 allowing the gravimeter sensor 4 to seek the vertical, as a pendulum, According to the theory of simple pendulums, the period of oscillation of a pendulum is given by $$T = 2\pi\sqrt{\frac{L}{g}} \text{, seconds}$$

where L is in meters and g is the acceleration of gravity (10 m/s$^2$). For L=0.1 m, for example, T=0.6 seconds. This means that regardless of the inclination of the gravimeter sensor 4 from vertical at the landing site, once the clutches are released, the gravimeter sensor 4 will pass through vertical in time T/4, or 0.15 seconds in this case. Thus, by re-engaging the clutches of the servo motors 11 at a time T/4 after their final initial release, the gravimeter sensor will be quite close to its required verticality. Thereupon the servo motors 11 are activated, each under the control of its respective level sensor 10, to achieve the ultimate precision of levelling (e.g. <20 arc seconds).

Alternatively, the clutches may be briefly reactivated several times on the initial pendulum swing, e.g., at T/8 intervals, to reduce the maximum angular momentum of the gravimeter sensor and therefore, the stresses on the clutches.

In this manner, even with several short activations of the clutches, the gravimeter sensor 4 may be brought close to vertical, well within the range of the level sensor 20 within one second. Thereafter, the clutches are engaged and, under the control of the level sensor 10, the servo motors 11 may bring the gravimeter sensor 4 into vertical within the desired ±20 arc second range.

The output signals from ground contact sensor 6, are provided to both the gravimeter and to a control and data acquisition system 12, disposed in the helicopter, via communication cable 3. The outputs of all other sensors in or on the gravimeter module 1 are transmitted via the cable 3 to the control and data acquisition system 12, in the helicopter 2.

A radar altimeter 13, located in the helicopter, provides quantitative information on the height of the helicopter above ground. A high accuracy GPS receiver 14, (preferably a dual-frequency, carrier-phase device) is mounted on the helicopter to provide rapid periodic updates of the spatial coordinates of the helicopter. A display screen 15, provides all pertinent information to the pilot or operator. A further reference GPS receiver 16, is preferably located in a fixed position near the survey area to provide corrections for ionospheric changes on the moving GPS receiver 14, either in real time by radio link, or off-line. More particularly, the distance measurement signals received from the satellites (usually at least four or five satellites being monitored at one time) are affected by changes in the ionosphere which can lead to erroneous information. By subtracting the location information generated by the secondary fixed GPS receiver 16 (within 50 km of the survey area) from the airborne receiver 14, relative position coordinates are obtained and the effects of ionospheric changes are cancelled. We have found that suitable GPS receivers for this purpose are, for example, the Turbo Rogue receivers, manufactured by Allan Osborne Associates, Inc.

It is contemplated that the design of the gravimeter module 1 be based on the well-proven Scintrex CG-3 Autograv™, automated portable land gravimeter. This system incorporates a quartz element sensor which is extremely rugged, and is able to withstand shocks of up to 25 g without damage, and without offsets greater than 0.02 mGals. The system has no requirement for clamping between readings and is compatible with helicopter vibrations in transport. The enclosure into which the gravimeter assembly is mounted is hermetically sealed, and is rated for immersion in water up to more than 10 m deep.

In survey operations, the GPS receiver 14, maintains kinematic lock with at least four GPS satellites in flight, thereby providing the spatial coordinates of the helicopter (latitude, longitude and altitude), commonly at one second update intervals, at all times. Reliable coordinate generation requires that the receivers have an essentially clear view of the sky at all times (ie. $2\pi$ field of view). Whereas, ideally, the most appropriate position of the GPS receiver 14, would be directly on the gravimeter module 1, in order to establish the exact coordinates of the gravimeter sensor 4, in practice, this is rarely feasible due to tree shading and hills in most areas. In addition, if the GPS receiver 14 is mounted directly on the gravimeter module 1, it is not possible to utilize the system in shallow water-covered areas, such as lakes, rivers, swamps, and sea-coasts.

According to the present invention, the GPS receiver 14, is mounted on the helicopter 2, or on the tow cable 3 at a very short distance below the helicopter. Of course, in order to maintain kinematic lock in this case, the helicopter 2 must have an uninterrupted view of the sky at all times. This necessitates that the helicopter maintain sufficient terrain clearance as to avoid all obstacles. In many areas, this imposes the condition that the helicopter remain aloft while conducting the survey. For survey operations, the cable 3 may be up to 30 m long for light helicopters like the Hughes 500, or as much as 50 m for heavier helicopters such as the Aerostar AS-350 B-2, which is especially useful in water-covered areas.

The entire system according to the present invention is fully automated and software controlled, such that the pilot is required only to respond to instructions on the display screen 15. All decisions about data quality, for example, are made by the software implemented by the system, as discussed in greater detail below with reference to FIG. 5.

At the start of a survey operation, the helicopter 2 and gravimeter module 1 are both on the ground and are interconnected by the cable 3. First, the helicopter takes off, rising vertically above the gravimeter module 1, and lifts it off of the ground. The helicopter then continues to rise to a transit level (eg. 100 m to 150 m) above the ground and proceeds to its first designated gravity station, under GPS guidance.

When, under GPS guidance, the helicopter 2, arrives at the location of a predetermined gravimeter station, the pilot seeks out the nearest suitable site for the station (eg. an opening in the trees) which is as free as possible of local topographic irregularities. The pilot then reduces his elevation, slowly lowering the gravimeter module 1 to the ground using the proximity sensor 7 as a guide to a soft landing. The proximity sensor is designed to provide a quantative estimate of the distances of the gravimeter module from the nearest ground point or water surface, with an accuracy of about 10 cm, from 0 to 10 m. A suitable such sensor is the 9000 Series, Piezo Transducer, manufacture by Polaroid Corporation. Lowering of the gravimeter module 1 to ground is followed, automatically, by the gravimeter measurements themselves. When all three legs of the tripod ground contact sensor 6 are on the ground, a signal is generated thereby and is transmitted to the gravimeter module 1 to activate the self-levelling process.

As discussed above, in order to obtain accurate gravimeter readings, the relative elevation of the gravimeter must be calculated in order to apply the usual correction for elevation. This correction is given by the formula Ce=+(0.3086−0.0419 d) h, in mGals, where d is the density of the near-surface rocks, in g/cm$^3$, and h is the elevation of the gravity sensor in m., relative to a predetermined datum level (eg. the elevation of GPS receiver 16).

For high precision regional gravity measurements (eg. correct to 0.02 mGals) a determination of h to within 10 cm relative accuracy is required. As indicated above, it is feasible to achieve this relative accuracy of elevation by means of modern GPS receivers. However, since the moving GPS receiver 14 is on the helicopter 2, and the gravimeter module 1 is on the ground, a problem arises of determining the relative elevation of the gravimeter and the GPS receiver on the helicopter, to within the required accuracy.

Several solutions may exist, including the use of electro-optical distance-ranging devices such as microwave or laser-based systems, etc. However, these devices are costly and complex in operation, and are difficult to automate.

The system of the present invention provides a solution to this problem. When the pilot is over the selected station and is descending, the tow cable 3 bears the weight of the gravimeter module 1, and functions, therefore, as a vertical "plumb-bob". In this condition, the vertical distance between the gravimeter sensor 1 and the GPS receiver 14, on the helicopter, is predictably constant to within the required accuracy of 10 cm., provided that the tow cable 3 remains within 4° of verticality. This distance remains constant, in fact, until the tension on the cable 3 is reduced by the gravimeter module contacting the ground. This occurs at the precise moment when the last of the three legs of the tripod on which the gravimeter module 1 is mounted touches firmly down. This is also the moment at which the ground contact sensor 6 is activated. The ground contact sensor 6 is so designed as to be activated only when all three legs of the tripod supporting the gravimeter module 1 have come to rest on the ground. The reason for this requirement is that when landing on an inclined surface the gravimeter sensor has not assumed its true elevation until all three legs are on the ground.

To achieve this requirement, the ground contact sensor 6 is made to consist of three individual contact sensors, one on each leg of the tripod. For simplicity, these may be connected in series, so that the sensor will be activated only when all three component sensors are so activated.

A suitable sensor component for this purpose, on each leg, may, for example, be the AU-PB-SD-C push button switch manufacture by Giannini Petro-Marine, Inc. which is both waterproof and sealed against mud, etc.

According to the present invention, a time marker is generated upon impact of the gravimeter module 1 with the ground. This time marker is sent to the controudata acquisition system 12, where its time is recorded, relative to the GPS clock time base.

GPS receivers are commonly programmed to provide coordinate updates at regular intervals, typically one second. The ground contact time markers will, of course, generally occur somewhere between two successive GPS updates. In order to determine the coordinates of the gravimeter 1 at the precise moment of landing it is necessary to interpolate between successive GPS coordinates.

Since the vertical velocity of the helicopter 2 is not constant in the interval spanning the landing of the gravimeter module 1 (eg. the pilot typically decelerates the helicopter in response to information from the proximity sensor 7), this interpolation is not linear. It therefore requires the use of a higher order polynomial, (eg. 3$^{rd}$ order polynomial), using two or more GPS coordinates before and after the contact time marker, in order to determine the coefficients of the polynomial.

The ground contact time marker is also presented on the display screen 15, for the information of the pilot. The pilot then descends a few metres, to provide enough slack on the cable 3, to allow a portion of the cable to lie on the ground, thereby decoupling any vibrations that might otherwise be transmitted down the cable 3 to the gravimeter sensor 4. The pilot then hovers while the system completes the gravimeter measurement (eg. typically 20–30 seconds duration).

Once the gravity measurement has been completed, with satisfactory accuracy as determined by the software, a signal is sent to the controudata acquisition console 12, and by it to the display screen 15 to indicate completion of the survey data acquisition. We have found that the DATA 1 data acquisition system, manufactured by Scintrex Limited, is suitable for this purpose. The pilot then lifts off, carrying the gravimeter module 1 to the next predetermined station. At the exact instant that the tow cable 3 becomes taut (ie. when the first of the three tripod legs ceases contacting the ground), the ground sensor 6 transmits another timing signal. This time marker provides a second measure, by interpolation, of the coordinates of the gravimeter module 1 on the ground at the moment of lift-off.

Figure 3:
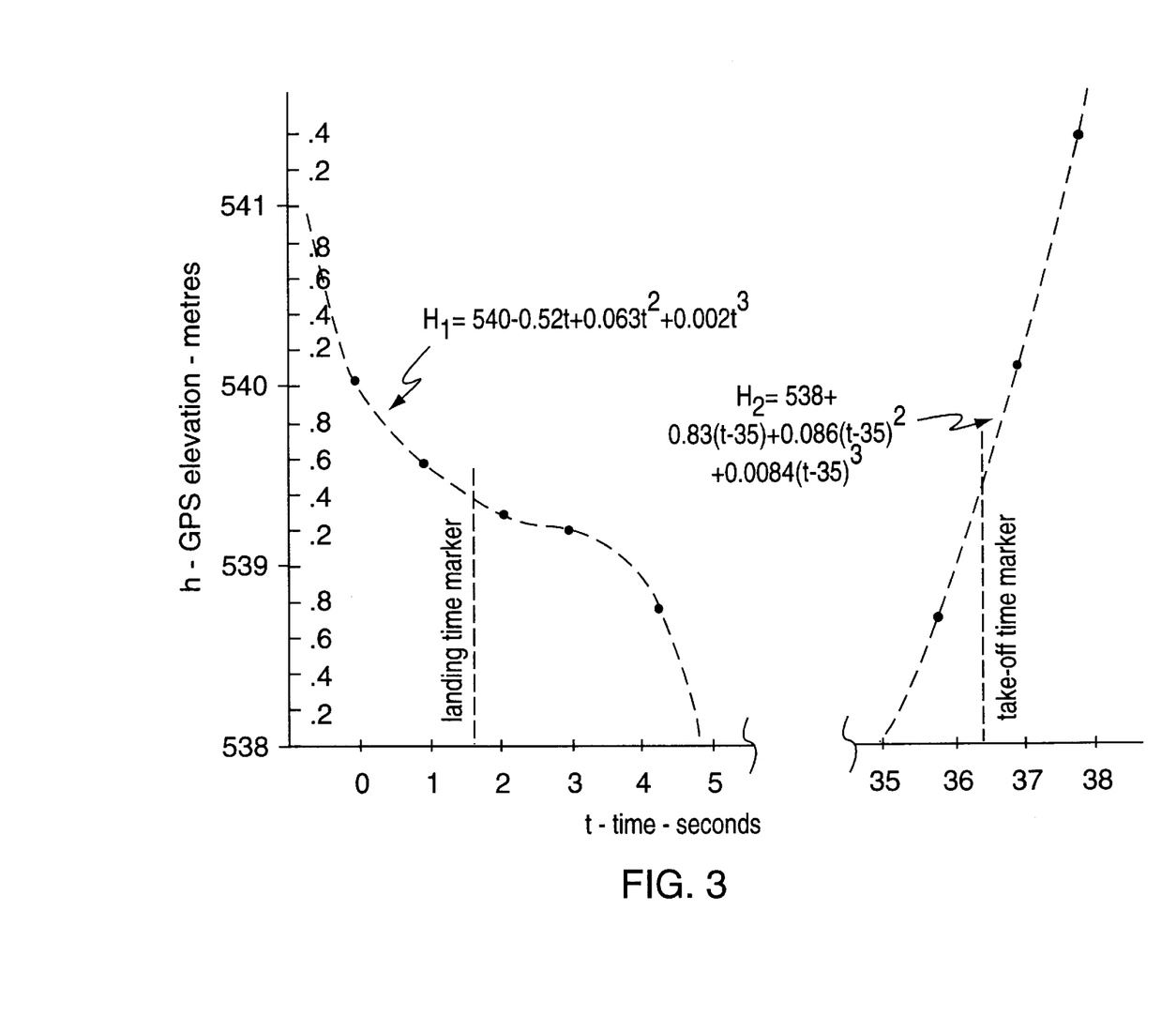
FIG. 3 is a graph showing calculation of station elevation of a gravimeter station according to the method of the present invention.

FIG. 3 illustrates the method by which precise elevation of the gravimeter station may be determined from a non-linear (eg. 3$^{rd}$ order polynomial) interpolation between periodic (eg. 1 second) GPS coordinate updates, both on landing and take-off of the gravimeter module 1. The coefficients of the two polynomials, in this case, are based on fitting the two GPS coordinate updates before and after the landing and take-off time markers.

The determination of the four coefficients of a polynomial of the 3$^{rd}$ order which passes through four consecutive 1 second GPS elevation coordinate values may be accomplished as follows:

The polynomial may be represented by the expression:

$Z = A + Bt + Ct^2 + Dt^3$, where t is the time of the GPS measurement. For simplicity, the value of t may be taken to be zero at the first coordinate measurement.

It can be seen that $A = Z_o$, i.e., the first GPS elevation (at time t=0). There are then three equations in the three unknowns, B, C and D, for the elevations at the three succeeding one second times:

$$Z_1 = Zo + B + C + D \text{ at } t=1 \text{ second}$$

$$Z_2 = Zo + 2B + 4C + 8D \text{ at } t=2 \text{ seconds}$$

and $$Z_3 = Zo + 3B + 9C + 27D \text{ at } t=3 \text{ seconds}$$

These equations are readily inverted, to provide values of the coefficients, as follows:

$$B = [-11Zo + 18Z_1 - 9Z_2 + 2Z_3]/6$$

$$C = [2Zo - 5Z_1 + 4Z_2 - Z_3]/2$$

and $$D = [-Zo + 3Z_1 - 3Z_2 + Z_3]/6$$

For the example shown in FIG. 3, the polynomial representing the elevation curve at the landing time maker is $H1 = 540 - 0.52t + 0.063t^2 + 0.002t^3$, while the polynomial representing the elevation curve at the lift-off time marker is $H_2 = 538 + 0.83(t-35) + 0.086(t-35)^2 + 0.0084(t-35)^3$.

Figure 4:
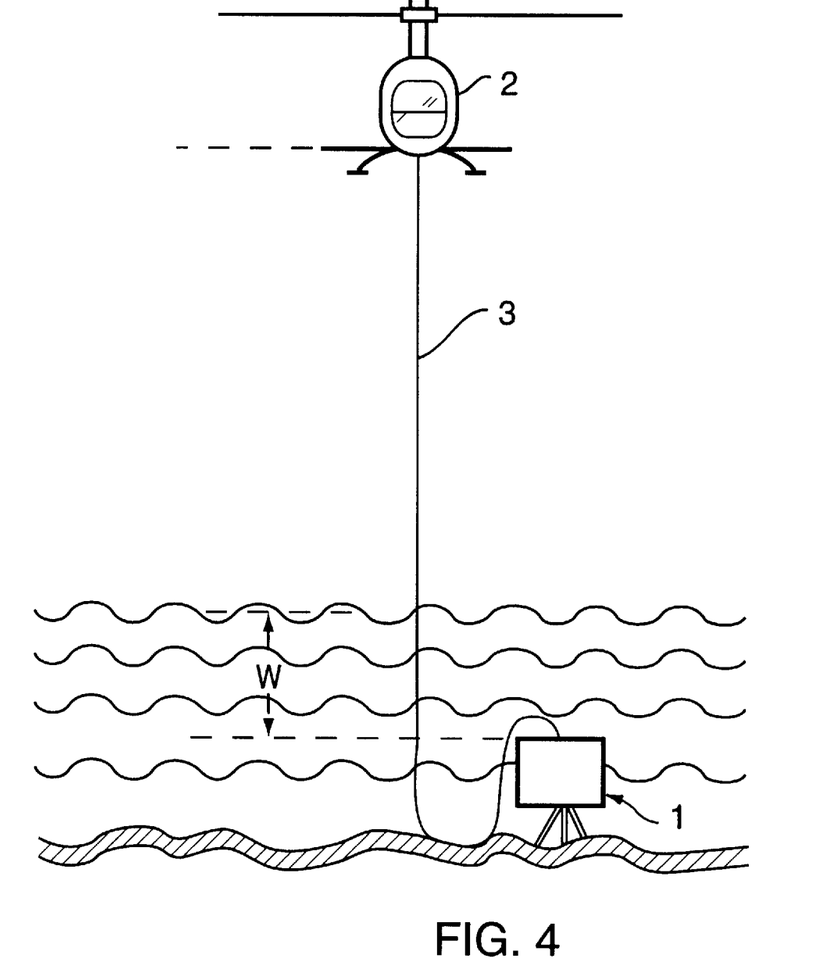
FIG. 4 shows the apparatus of the present invention in use on shallow-water covered areas.

FIG. 4 shows the system of the present invention in operation at a station which is covered with shallow water. The only physical change required to the system for such use, is the addition of weights at the base of the gravimeter module 1, so that it has sufficient negative buoyancy as to sink rapidly to the bottom of the water.

For this application, a water immersion sensor 9, provides time markers at the moment of immersion and emergence, which permit the determination of the GPS elevation of the water surface. We have found that a suitable sensor for those purpose is the LV 11 Water Level Sensor, manufactured by Omega, Inc. When the module comes to rest on the bottom, the ground contact sensor 6 provides a time marker in the usual manner, in order to allow the determination of the relative elevation of the station. However, the water pressure monitor 8, provides an independent indication of the water depth at the station which, when coupled with the elevation of the water surface, gives still another measure of the relative elevation of the station. We have found that a suitable water pressure monitor is the PX216-030 AI model, manufactured by Omega, Inc.

Knowledge of the depth of water at the station is required in order to correct for the negative gravity effect of the water lying over the gravimeter sensor 4, at the station. The appropriate correction is given by Cw=+0.0419 w, measured in mgals, where w is the overlying water depth, in m.

When the station is water-covered as shown in FIG. 4, the proximity sensor 7 serves to provide the pilot with distance information to the water surface, thereby assisting the pilot to ensure a soft landing on the water.

Other embodiments and modifications of the invention are possible without departing from the sphere and scope defined by the claims appended hereto.

I claim:

1. Apparatus for conducting helicopter-supported gravity surveys of a survey area, comprising:
   a gravimeter module suspended below a helicopter and adapted to be lowered to the earth's surface for generating gravimeter readings, said gravimeter module including an automatic reading gravimeter sensor and means for self-levelling said sensor;
   a ground contact sensor for determining when said gravimeter module contacts the earth's surface as a result of being lowered thereto, and in response generating a time marker indicative thereof;
   a GPS receiver mounted in fixed relationship to said helicopter for generating periodic position coordinates; and
   a system for receiving and recording said gravimeter readings, said periodic position coordinates and said time marker on a common time base.

2. Apparatus for conducting helicopter-supported gravity surveys of a survey area, comprising:
   a gravimeter module suspended below a helicopter and adapted to be lowered to the earth's surface for generating gravimeter readings, said gravimeter module including an automatic reading gravimeter sensor and means for self-levelling said sensor;
   a ground contact sensor for determining when said gravimeter module ceases contacting the earth's surface as a result of being raised therefrom subsequent to generation of said gravimeter readings, and in response generating a time marker indicative thereof;
   a GPS receiver mounted in fixed relationship to said helicopter for generating periodic position coordinates; and
   a system for receiving and recording said gravimeter readings, said periodic position coordinates and said time marker on a common time base.

3. The apparatus of claim 1, wherein said system further includes means for calculating the position of said gravimeter module when said gravimeter module contacts the earth's surface, by means of interpolating between respective values of said periodic position coordinates at said time marker.

4. The apparatus of claim 2, wherein said system further includes means for calculating the position of said gravimeter module when said gravimeter module ceases contacting the earth's surface, by means of interpolating between respective values of said periodic position coordinates at said time marker.

5. The apparatus of claim 1, further comprising three legs projecting from a bottom surface of said gravimeter module, and three contact switches connected to respective ones of said legs, whereby upon closure of all of said contact switches said time marker is generated.

6. The apparatus of claim 2, further comprising three legs projecting from a bottom surface of said gravimeter module, and three contact switches connected to respective ones of said legs, whereby upon opening of any one of said contact switches said time marker is generated.

7. The apparatus of claim 1 or 2, further including a proximity sensor mounted to said gravimeter module for indicating distance of said gravimeter module above the earth's surface.

8. The apparatus of claim 3 or 4, further including a farther GPS receiver located at a predetermined fixed location on the earth's surface and in the vicinity of said survey area for providing information in response to which said system corrects its calculation of said position of the gravimeter module to account for ionospheric effects.

9. The apparatus of claim 1 or 2, further including a water pressure monitor for determining water depth of said gravimeter module when said module is lowered into water below the earth's surface.

10. The apparatus of claim 1 or 2, further including a water immersion sensor for generating further time markers upon entry of said gravimeter module into water and emergence of said module therefrom.

11. The apparatus of claim 1 or 2, wherein said means for self-levelling said sensor includes pendulum means for rapid coarse levelling and motor driven means controlled by the output of level sensors rigidly mounted on said gravimeter sensor, to achieve fine levelling.

12. A method of conducting helicopter-supported gravity surveys, comprising the steps of:

suspending a self-levelling automatic reading gravimeter sensor from a helicopter, said sensor being capable of generating gravimeter readings when in contact with the earth's surface;

lowering said gravimeter sensor to the earth's surface;

determining the GPS relative coordinates of said gravimeter sensor while said gravimeter sensor is being lowered;

generating a time marker in response to said sensor contacting the earth's surface;

levelling said gravimeter sensor and obtaining said gravimeter readings therefrom while said gravimeter sensor is in contact with the earth's surface and said helicopter hovers overhead; and recording said gravimeter readings, said GPS relative coordinates and said time marker on a common time base.

13. A method of conducting helicopter-supported gravity surveys, comprising the steps of suspending a self-levelling automatic reading gravimeter sensor from a helicopter, said sensor being capable of generating gravimeter readings when in contact with the earth's surface;

lowering said gravimeter sensor to the earth's surface;

levelling said gravimeter sensor and obtaining said gravimeter readings therefrom while said gravimeter sensor is in contact with the earth's surface and said helicopter hovers overhead;

raising said gravimeter sensor from the earth's surface subsequent to generation of said gravimeter readings;

determining the GPS relative coordinates of said gravimeter sensor while said gravimeter sensor is being raised;

generating a time marker in response to said sensor ceasing to be in contact with the earth's surface; and recording said gravimeter readings, said GPS relative coordinates and said time markers on a common time base.

14. The method of claim 12 or 13, further comprising the step of determining the elevation of said gravimeter sensor on the earth's surface by interpolating said GPS relative coordinates before and after said time marker.

15. The method of claim 14, further comprising the step of correcting said determining of the elevation of said gravimeter sensor to account for ionospheric effects.

16. The method of claim 14, wherein said step of interpolating comprises fitting at least two of said GPS relative coordinates before and after said time marker onto a polynomial function of elevation versus time and calculating for said elevation at a time equal to said time marker.

17. The method of claim 12 or 13, further comprising the steps of immersing said gravimeter sensor in water below the earth's surface and determining water depth by means of a water pressure monitor.

18. The method of claim 17, further comprising the step of recording when said gravimeter sensor is immersed in said water.

19. The method of claim 17, further comprising the step of lifting said gravimeter sensor out of said water.

20. The method of claim 19, further comprising the step of recording when said gravimeter sensor emerges from said water.

21. The method of claims 12 or 13 wherein said gravimeter sensor is levelled in two stages, firstly, in a coarse but rapid fashion by pendulum action and then by motor driven means, controlled by the output of level sensors which are rigidly mounted on the gravimeter sensor.

* * * * *